United States Patent [19]

Ball et al.

[11] 4,025,437
[45] May 24, 1977

[54] ROTARY FILTER APPARATUS HAVING SLURRY AGITATOR

[75] Inventors: Harry Ball, Piscataway; James M. Stauffer, Moorestown, both of N.J.

[73] Assignee: Technical Fabricators, Inc., Piscataway, N.J.

[22] Filed: Nov. 29, 1975

[21] Appl. No.: 644,907

[52] U.S. Cl. .................................. 210/383; 210/400
[51] Int. Cl.² .......................................... B01D 33/04
[58] Field of Search ............ 210/77, 109, 383, 387, 210/400, 401, 402

[56] References Cited
UNITED STATES PATENTS

| | | | |
|---|---|---|---|
| 1,043,939 | 11/1912 | Isherwood | 210/383 X |
| 1,359,578 | 11/1920 | Costello | 210/383 X |
| 2,525,135 | 10/1950 | Hoff | 210/383 X |
| 2,899,066 | 8/1959 | Peterson et al. | 210/383 |
| 3,726,510 | 4/1973 | Davis et al. | 210/383 X |
| 3,814,259 | 6/1974 | Kamimora et al. | 210/401 X |
| 3,826,370 | 7/1974 | Ball et al. | 210/109 |
| 3,919,088 | 11/1975 | Doncea et al. | 210/402 |

*Primary Examiner*—John Adee
*Attorney, Agent, or Firm*—Burgess Ryan and Wayne

[57] ABSTRACT

A rotary filter apparatus includes a tank for containing a slurry to be filtered. A rotary drum is mounted for rotation about a horizontal axis. The drum has a filter surface which extends into the slurry, so that the filtrate may be withdrawn from the interior of the drum. An agitator in the bottom of the tank includes a vane mounted below the drum for rotation about a horizontal axis. The vane is driven to reciprocate through a driven angle about its rotational axis.

5 Claims, 5 Drawing Figures

ROTARY FILTER APPARATUS HAVING SLURRY AGITATOR

This invention is related to rotary filters, wherein a drum having a filter surface is at least partially immersed in a slurry in a tank, whereby a filtrate may be withdrawn from the interior of the drum. The invention is more particularly directed to means for agitating the slurry in the tank of such a filter apparatus.

Rotary filters are well known, of the type wherein a drum having a filter surface extends at least partly into a tank containing a slurry to be filtered. Such filters are disclosed, for example, in U.S. Pat. Nos. 3,651,946, Ball et al, 3,791,527, Ball et al, and 3,826,370. Ball et al. In these patents, the drum rotates about a horizontal axis, and the outer surface of the drum is apertured. The filter medium comprises newsprint, which may overlie a web on the surface of the drum, the newsprint being continually fed to cover at least the portion of the circumference of the drum extending into the slurry. In arrangements of this type it is necessary of course to provide means for preventing loss of pressure in regions of the drum not extending into the slurry, and for this purpose these patents disclose arrangements wherein the circumference of the drum is as completely externally covered as possible. It will be apparent, of course, from the following disclosure, that the present invention is not limited to such specific forms for the filter media or for the prevention of loss of pressure in the drum, and that the invention is applicable to rotary filters employing different means for accomplishing these functions.

Many slurries, such as fly ash, diatomaceous earth, heavy metal hydroxides, etc., have a tendency to settle out rapidly in rotary filters of the above type. Such settling out of the slurries results in the buildup of solid materials in the bottom of the tank. It is desirable to avoid such settling out of the slurry, since the solids may be more readily disposed of in the form of a buildup on the filter media. If the solid materials are deposited in the bottom of the tank rather than on the filter media, the down time of the rotary filter is increased due to the necessity of removing the materials before they interfere with the operation of the filters.

In the past, attempts have been made to solve this problem by providing a rake tye agitator or a revolving set of paddles at the bottom of the tank. It has been found, however, that such agitation devices do not provide the desired agitation of the slurry. For example, when a continuously rotating vane shaft having 1–4 vanes is provided for agitating the slurry, a circular motion is set up in the slurry, and this circular motion sets into motion only from 1/3 to 1/2 of the slurry, from the bottom upwardly. This is especially true with respect to heavier slurries, such as fly ash and diatomaceous earth.

While such rotating vanes of course result in a decrease in the down time of the rotary filter, it is apparent that the effectiveness of the rotating vanes is not as great is desired in the agitation of the slurry to minimize the buildup of settled materials.

In rake type agitators, complex assemblies of push rods and linkages are required to move a rake agitator, and many guards are required in order to cover these moving parts. Such assemblies are of course relatively expensive, and are subject to breakdown.

The present invention is therefore directed to the provision of an agitator for a rotary filter of the above type, wherein the disadvantages of prior agitation assemblies as above discussed are overcome.

Briefly stated, in accordance with the invention, an agitator for the slurry of a rotary filter, such as a rotary vacuum filter, is comprised of a vane mounted in the bottom of the tank, below the drum, for relative rotation about a horizontal axis. Means are provided for reciprocating the vane about a determined angle, as opposed to the continuous rotary movement of vanes of the prior art, in order to effect the agitation of the slurry.

It has been found that, with an agitator of the type in accordance with the invention, the slurry may be effectively agitated without washing off cake on the drum. The device is accordance with the invention is simple in construction, and does not require the complex moving parts and guards of a rake type agitator.

In order that the invention will be more clearly understood, it will now be disclosed in greater detail with reference to the accompanying drawings, wherein.

Figure 1:
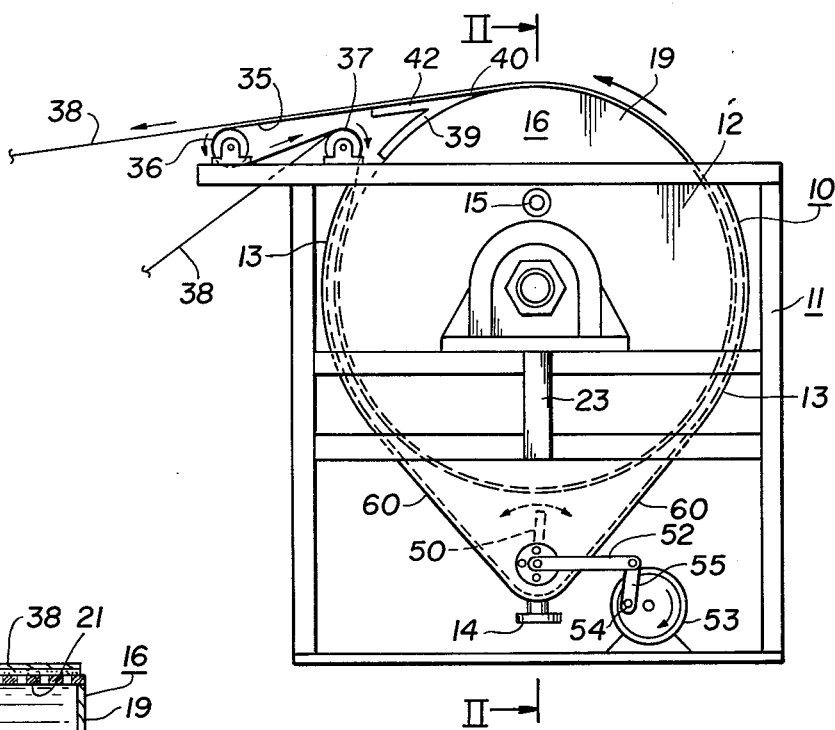
FIG. 1 is a side view of a typical rotary filter incorporating an agitator in accordance with the invention.
Figure 2:
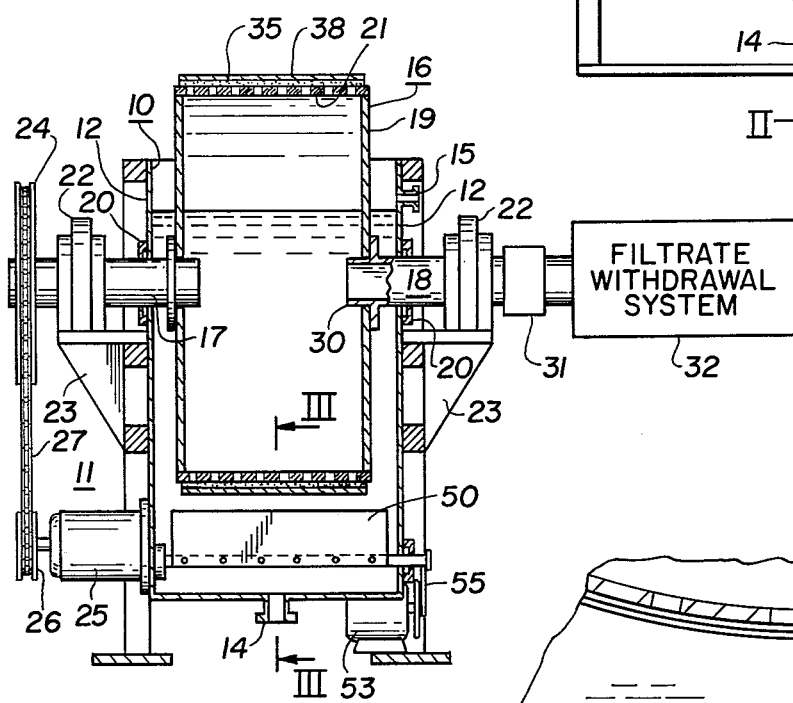
FIG. 2 is a cross sectional view of the filter of FIG. 1, taken along the lines II-II.

Referring now to the drawings, and more in particular to FIGS. 1 and 2, therein is illustrated a rotary filter apparatus incorporating an agitator, in accordance with the present invention. It will be recognized that these figures generally depict a rotary filter of the type shown in U.S. Pat. No. 3,826,370, but this configuration for the rotary filter is employed in the present disclosure solely for the purpose of simplifying the explanation of the invention, and the invention is not limited to this specific form of rotary filter apparatus.

The filter apparatus of FIGS. 1 and 2 is comprised of a tank 10 suitably mounted in a frame 11. The tank 10 may conveniently have substantially flat vertical ends 12, and curved sides 13. A suitable inlet and a drain connection 14 may be provided in the bottom of the tank, for introducing slurry to be filtered into the tank and for draining the tank when necessary. Similarly, an overflow connection 15 may be provided in the upper portion of the tank, to prevent filling of the tank to an excessive extent.

A drum 16 is mounted for rotation about a horizontal axis in a slurry to be filtered in the tank 10. For example, shafts 17 and 18 may be affixed by conventional means to the sides 19 of the drum, the shafts extending through suitable rotary seals 20 in the walls 12 of the tank. The circumferential surface 21 of the drum 16 is apertured.

The shafts 17 and 18 are supported externally of the tank is suitable bearings 122 mounted on flanges 23 affixed to the frame 11. The shaft 17, constituting the drive shaft for the drum, is provided with a sprocket 24. A motor 25, for example mounted on the frame 11, is provided with a further sprocket 26, and a drive chain 27 for the drum extends between the sprockets 24 and 26.

In order to enable withdrawal of filtrate from the interior of the drum 16, the shaft 18 may be hollow, with its end 30 extending into the interior of the drum. The shaft 18 extends to a rotary seal 31 at the external end thereof for directing the filtrate to a suitable conventional filtrate withdrawal system 32. For example, the filtrate withdrawal system may comprise a vacuum pump.

As in the arrangement of U.S. Pat. No. 3,826,370, a continuous porous web 35 extends around the periphery of the drum 16 in the region of the drum in the slurry. The web 35 is guided away from the top of the drum by a roller 36 mounted at the top of the frame 11, and thence back to the surface of the drum by a further roller 37 also mounted at the top of the frame. A filter media, for example in the form of newsprint 38, is also directed to the drum by way of the roller 37, to overlie the web thereon. The newsprint 38 is disposable, and hence is not redirected to the drum by the roller 36. The newsprint 38 with any materials deposited thereon from the slurry during the filtering operation may be suitably disposed of. In order to avoid loss of pressure (i.e., vacuum) in the drum by way of the apertured drum surface 21, a suitable arcuate plate 39 may be mounted against the region of the drum between the point at which the web separates from the drum and the point at which the web is redirected to the drum. The plate 39 may have a sharp leading edge 40 to facilitate the separation of the web from the drum, as well as an extension 42 for supporting the web and newsprint as they leave the surface of the drum.

The above described rotary filter apparatus is conventional, and has been described only to show a typical environment of the present invention. It will be apparent that numerous variations may be needed therein, since the agitator device in accordance with the invention may be employed with other types of rotary filters.

Figure 3:
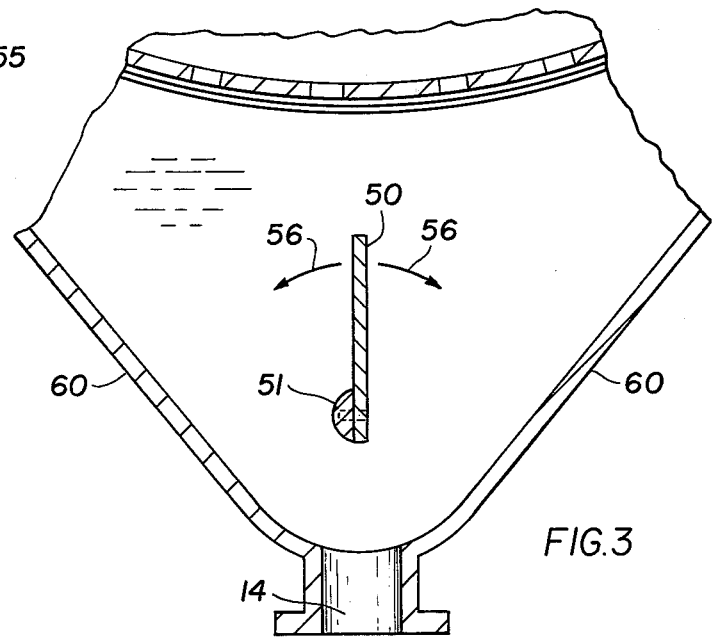
FIG. 3 is a cross sectional view of a portion of the filter of FIG. 2 taken along the lines III-III, and illustrating one embodiment of the construction of the vane in accordance with the invention.

In accordance with the invention, an agitator for the rotary filter is comprised of a vane 50 mounted for rotation about a horizontal axis in the bottom of the tank, below the drum 16. The vane 50 preferably extends for the greater part of the distance between the tank walls 12. As illustrated in FIG. 3, the lower edge of the vane 50 may be affixed to a horizontal shaft 51, by any suitable means, the shaft 51 being rotatably mounted in the bottom of the tank between the walls 12. The shaft 50 extends through a suitable seal through one of the walls 12, and a lever 52 is affixed to the shaft 51 externally of the tank.

A motor 53 is fixedly mounted, for example to the frame 11, and drives a crank 54. A crank 55 has one end pivoted to the crank 54 and the other end pivoted to the free end of the lever 52, as illustrated in FIG. 1.

With this arrangement, it is evident that rotation of the shaft of the motor effects the reciprocation of the vane 50 about the axis of the shaft 51, as indicated by the arrows 56 in FIG. 3. It has been found that such reciprocation of a vane in the bottom of the tank, about a horizontal axis, effects the substantially complete circulation and agitation of the material of the slurry, without the tendency of the fluid to form a rotary laminar flow as in the prior art arrangements employing rotary vanes. Thus, the circular motion inherent in a rotary vane system is not built up in the arrangement in accordance with the invention. Further, it is apparent that the agitation system of the present invention is simple and economical to fabricate, and is hence not subject to as frequent breakdowns as the rack type agitators which have been previously employed.

In embodiments of an agitator in accordance with the invention, it has been found that at given reciprocation rates of the vane, depending upon the tank configuration and the volume of slurry in the tank, a harmonic motion may be set up in the slurry, and that this harmonic motion may cause the slurry to rock and splash over the top of the tank. In order to avoid this, suitable means are preferably employed for controlling the rate of reciprocation of the vane. Thus, it is preferred that the motor 53 be a variable DC controlled motor. Alternatively, a variable belt driven agitator may be employed.

It has been found that satisfactory agitation of the slurry may be effected, in accordance with the invention, with reciprocation rates of 50 to 250 reciprocation cycles per minute. The optimum rate, however, is between 100 and 150 reciprocation cycles per minute. At these reciprocation rates, a very gentle agitation occurs in the slurry that has been found not to wash off cake formed on the drum, but still keeps the heaviest particles in the slurry in suspension.

It is of course necessary that the vane 50 be agitated to a sufficient angle that effective agitation of the slurry result. While this angle is not critical, it has been found that an angle of about 90° between the extreme positions of the vane 50 is satisfactory. The radial dimension of the vane 50, with respect to the shaft 51, must also be adequate to agitate the slurry. This dimension is of course dependent also upon the size of the tank. As illustrated in FIGS. 1 and 3, the faces 60 of the bottom of the tank are generally straight and inclined toward one another, in the form of the cross section of a frustum of a cone. This configuration is particularly desirable, since it provides a sufficient volume in the bottom of the tank for the mounting and reciprocation of the vane, without unnecessarily increasing the volume at the bottom of the tank. The inclined walls 60 thus aid in the maintenance of the agitation state of the slurry in the tank.

In accordance with the invention, it has been found that the rate of reciprocation or oscillation of the vane 50, in order to provide effective agitation of the slurry, is dependent upon the settling characteristics of the slurry. In particular, the reciprocation is dependent upon the "time to prevent settling" in the slurry, hereinafter referred to as the TPS of the slurry. This characteristic is defined as the maximum time interval between successive agitations of the slurry which must be effected in order to maintain the solids of the slurry in suspension, i.e., to prevent settling of the solids. For example, with some slurries the solids will tend to settle out if the slurry is not agitated at least once every 5 seconds, and the TPS time for such slurries would of course be five seconds. Other slurries may have TPS times of, for example, 30 seconds.

Figure 4:
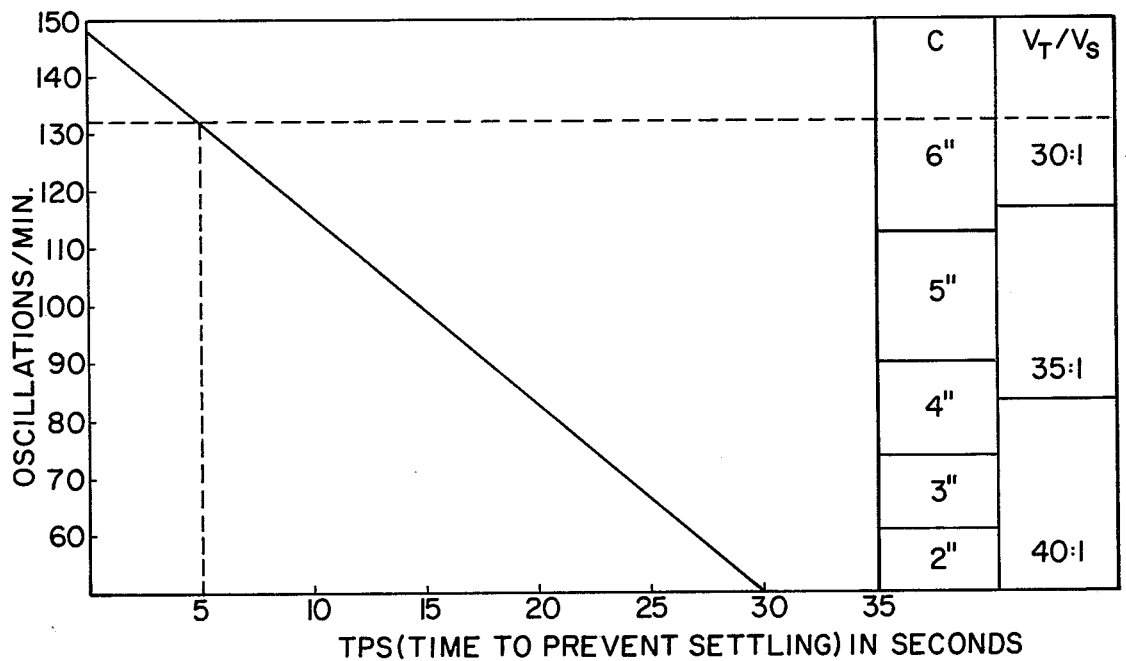
FIG. 4 is a curve illustrating the relationship between the parameters of the filter of the invention and the characteristics of the slurry.

The graph of FIG. 4 illustrates the relationship between the reciprocation or oscillations per minute of the vane 50, and the TPS of the slurry being agitated, in order to maintain the solids of the slurry in suspension, in accordance with the invention. It is of course apparent that more rapid reciprocation rates are undesirable, since they result in needless excessive agitation of the slurry, which may tend to wash off cake that has already deposited on the drum. Similarly, it has been found that lower reciprocation rates are undesirable, since they do not result in adequate agitation of the slurry.

The maintenance of the solids of the slurry in suspension, in accordance with the invention, is also dependent other parameters. These parameters are illustrated with reference to FIG. 5, which shows, in simplified form, a cross sectional view of a drum filter. Thus, the vane 50 has a radius $r$ (i.e., the dimension of the vane normal to its axis), and a length 1, and the volume $V_s$ of the sector through which the vane moves, in square inches, is equal to $0.008727ar^21$, where $a$ is the arc of the sector in degrees, and the dimensions of the vane are in inches. The tank in which the drum is positioned has a volume $V_t$ (excluding the volume of the drum). In addition, there is a minimum distance C, between the side walls 12 of the tank and the drum 16. In addition, as noted in FIG. 5, the minimum distance between the volume $G_s$ and the drum 16 is also C.

Referring again to FIG. 4, it has been experimentally determined that, the faster a slurry settles, the larger must be the area of the vane sector, and hence the larger must be the volume $V_s$. In addition, the faster the slurry settles, i.e., the lower the TPS time, the greater the number of reciprocations per minute of the vane must occur. This increase in the rate of reciprocation results in an increase in the agitation of the slurry, and as a result the minimum dimension C must be increased to avoid washing off of deposited cake on the drum.

Figure 5:
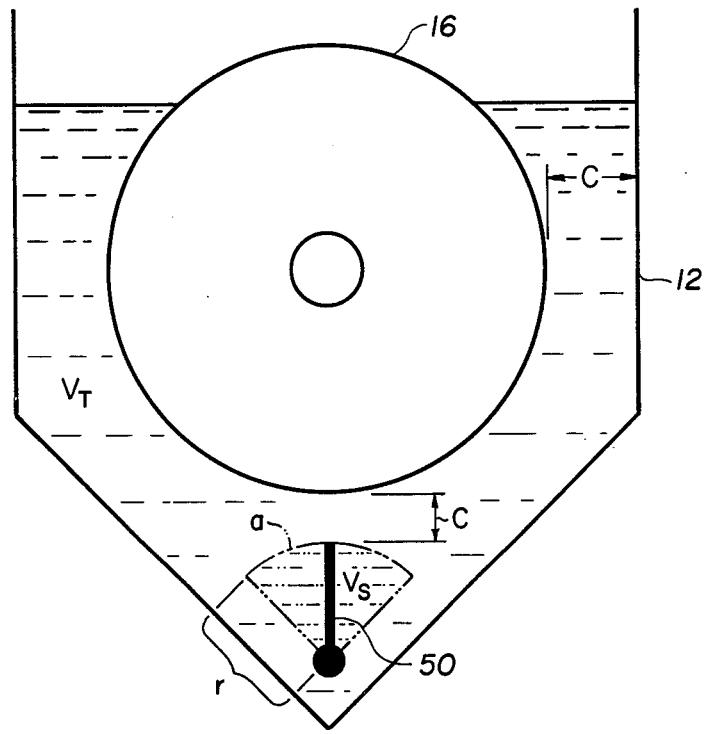
FIG. 5 is a simplified illustration of the filter, identifying the parameters of FIG. 4.

The dotted lines in FIG. 5 illustrate a typical embodiment of the parameters in accordance with the invention. Thus, if the slurry to be filtered has been found to have a TPS time of 5 seconds, then 132 reciprocations or oscillations per minute are required of the vane to keep the solids of the slurry in suspension. With this rate of reciprocation, the dimension C must be at least 6 inches, and the ratio of the volume $V_t$ of the tank to the volume $V_s$ of movement of the vane must be about 30:1.

From FIG. 4, it is apparent that for reciprocation rates under about 62, the distance C may be 2 inches, for reciprocation rates between about 62 and about 74, the distance C should be about 3 inches, for reciprocation rates between about 74 and 90 the distance C should be about 4 inches, for reciprocation rates between about 90 and 112 the distance C should be about five inches, and for reciprocation rates between 112 and about 147 the distance C should be about 6 inches. Further, for reciprocation rates below about 83 the ratio $V_t/V_s$ may be about 40:1, for reciprocation rates between about 83 and about 118 the ratio $V_t/V_s$ should be about 35:1, and for reciprocation rates above about 118 per minute the ratio should be about 30:1. In addition, the curve of FIG. 4 illustrates that the reciprocation rate per minute is equal to about:

$$-3.2 \times +147$$

where $x$ is the TPS of the slurry in seconds.

While the invention has been displaced and described with reference to a single embodiment, it will be apparent that variations and modifications may be made therein, without departing from the invention. For example, the mounting of the vane may obviously be effected by any other conventional means. It is intended in the following claims to cover each such variation and modification as falls within the true spirit and scope of the invention.

What is claimed is:

1. A rotary filter capable of effectively filtering a slurry containing solid particles which tend to settle out of the slurry, comprising:
   a tank for containing the flurry to be filtered, said tank having a pair of generally straight oppositely disposed wall surfaces inclined toward one another and tapered to meet at the bottom of the tank;
   a rotary filter drum disposed within the tank and mounted for rotation about a horizontal axis parallel to said wall surfaces, said drum being immersible in said slurry so that a filter surface thereon contacts the slurry;
   filtrate pump means to withdraw filtrate from the interior of said drum;
   a rotatable shaft parallel to said wall surfaces and said drum axis, said shaft being disposed within said tank adjacent the bottom thereof;
   a single vane affixed to said shaft and extending upwardly therefrom, said vane extending substantially across the entire width of said tank in a direction parallel to said wall surfaces; and
   means for imparting reciprocating motion to said shaft to reciprocate said vane at a rate sufficient to substantially preclude settlement of said particles out of said slurry.

2. The filter of claim 1 wherein said means reciprocating said vane comprises means for reciprocating said vane at a rate of 50 to 250 reciprocation cycles per minute.

3. The filter of claim 1 wherein said means reciprocating said vane comprises means for reciprocating said vane at a rate of 100 to 150 reciprocation cycles per minute.

4. The filter of claim 1 wherein said means reciprocating said vane comprises means for varying the reciprocation rate of said vane.

5. The rotary filter of claim 1 wherein said means for reciprocating said vane comprises means reciprocating said vane at a rate substantially equal to $-3.2 \times +147$, wherein $x$ is the time to prevent settling characteristic of the slurry in the tank, in seconds, wherein said drum is spaced from the walls of said tank and from the volume swept by said vane a minimum distance from 2 to 6 inches, and wherein the ratio of the volume of the slurry in the tank to the volume swept by the vane is in the range of from 30:1 to 40:1.

* * * * *

UNITED STATES PATENT OFFICE
CERTIFICATE OF CORRECTION

Patent No. 4,025,437  Dated May 24, 1977

Inventor(s) Harry Ball, et al

It is certified that error appears in the above-identified patent and that said Letters Patent are hereby corrected as shown below:

Column 1, line 47: "tye" should be --type--.

line 62: "is desired" should be --as desired--.

Column 2, line 64: "122" should be --22--.

Column 4, line 3: "rack" should be --rake--.

Column 5, line 6: Insert "upon" between "dent" and "other".

Column 6, line 2: "displaced" should be --disclosed--.

line 15: "flurry" should be --slurry--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks